US006340488B1

(12) United States Patent
French et al.

(10) Patent No.: US 6,340,488 B1
(45) Date of Patent: Jan. 22, 2002

(54) METHOD FOR MAKING LACED APPEARING CONFECTIONERIES

(75) Inventors: William French; Edward Morris Kuehl, both of Dublin; Kurt A. Busse, Radnor, all of OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/495,449

(22) Filed: Feb. 1, 2000

Related U.S. Application Data

(63) Continuation-in-part of application No. 09/145,739, filed on Sep. 2, 1998, now Pat. No. 6,267,073, which is a continuation-in-part of application No. 08/986,185, filed on Dec. 5, 1997, now Pat. No. 6,194,014, which is a continuation-in-part of application No. 08/901,727, filed on Jul. 28, 1997, now abandoned, which is a continuation-in-part of application No. 08/771,788, filed on Dec. 20, 1996, now abandoned.

(51) Int. Cl.[7] .............................. A23G 3/00; B05C 5/00
(52) U.S. Cl. ........................ 426/302; 118/14; 118/24; 426/249; 426/306; 426/307
(58) Field of Search ................................ 426/302, 306, 426/307, 249, 101; 118/13, 14, 24, 25, DIG. 16

(56) References Cited

U.S. PATENT DOCUMENTS

| 615,191 A | 11/1898 | Lembke | |
|---|---|---|---|
| 1,470,524 A | 9/1923 | Burt | |
| 1,777,896 A | 10/1930 | Rossi | |
| 1,865,097 A | 6/1932 | Gilham | |
| 2,246,871 A | 6/1941 | Balch | 107/54 |
| 2,288,970 A | 7/1942 | Weisbender | 99/137 |
| 2,418,190 A | 4/1947 | Overland | 107/54 |
| 2,457,110 A | 12/1948 | Burbank et al. | 99/134 |
| 2,570,031 A | 10/1951 | Gibson | 99/137 |
| 2,646,757 A | 7/1953 | Hackmann | 107/1 |
| 2,774,314 A | 12/1956 | Moser | 107/1 |
| 3,091,194 A | 5/1963 | Dickinson | 107/54 |
| 3,230,906 A | 1/1966 | MacManus | 107/54 |
| 3,285,202 A | 11/1966 | MacManus | 107/54 |
| 3,288,052 A | 11/1966 | Hough | |
| 3,427,650 A | 2/1969 | Woody | |
| 3,545,981 A | 12/1970 | Klein et al. | 99/138 |
| 3,556,022 A | 1/1971 | Westin | 107/54 |
| 3,572,256 A | 3/1971 | Westin | |
| 3,690,896 A | 9/1972 | Maxwell | 99/81 |
| 3,770,460 A | 11/1973 | Vroman | 426/279 |
| 3,818,859 A | 6/1974 | Kalmar | 118/24 |
| 3,824,950 A | 7/1974 | Woody | 118/14 |
| 3,971,853 A | 7/1976 | Crowder | 426/249 |
| 4,032,667 A * | 6/1977 | Kreuter | 426/306 |
| 4,105,801 A | 8/1978 | Dogliotti | 426/99 |
| 4,189,502 A | 2/1980 | Rubenstein | 426/249 |
| 4,200,658 A | 4/1980 | Katzman et al. | 426/512 |
| 4,369,200 A | 1/1983 | Iwao et al. | 426/660 |
| 4,382,968 A | 5/1983 | Akutagawa | 426/249 |
| 4,421,773 A | 12/1983 | Akutagawa | 426/249 |
| 4,477,473 A | 10/1984 | Schoonmaker et al. | 426/231 |
| 4,563,358 A | 1/1986 | Mercer et al. | 426/89 |
| 4,587,128 A | 5/1986 | Cummings | 426/303 |
| 4,622,891 A | 11/1986 | Cramer et al. | 99/450.4 |

(List continued on next page.)

Primary Examiner—George C. Yeung
(74) Attorney, Agent, or Firm—Winston & Strawn

(57) ABSTRACT

The present invention advantageously provides a method for making and an apparatus for applying a chocolate coating to a confectionery to produce a confectionary with a laced appearing coating. The laced appearing coating preferably includes more than one type of chocolate, preferably two types of chocolate. Advantageously, the laced appearing coating is formed from two layers of chocolate, a foundation chocolate layer and a laced chocolate layer, thus giving the laced appearing chocolate coating a three dimensional texture.

28 Claims, 2 Drawing Sheets

U.S. PATENT DOCUMENTS

| | | | |
|---|---|---|---|
| 4,758,143 A | 7/1988 | Lopes | 425/91 |
| 4,778,683 A | 10/1988 | Newsteder | 426/249 |
| 4,873,104 A | 10/1989 | Butcher et al. | 426/249 |
| 4,910,661 A | 3/1990 | Barth et al. | 364/167.01 |
| 4,986,080 A | 1/1991 | Grigoli et al. | 62/75 |
| 5,019,404 A | 5/1991 | Meisner | 426/249 |
| 5,209,779 A * | 5/1993 | Talerico | 118/24 |
| 5,229,149 A | 7/1993 | Cone | 426/91 |
| 5,248,338 A | 9/1993 | Price | 106/712 |
| 5,256,426 A | 10/1993 | Tomioka et al. | 426/100 |
| 5,343,710 A | 9/1994 | Cathenaut et al. | 62/71 |
| 5,374,436 A | 12/1994 | White et al. | 426/249 |
| 5,435,143 A | 7/1995 | Heinrich | 62/75 |
| 5,447,036 A | 9/1995 | Heinrich | 62/75 |
| 5,480,664 A | 1/1996 | Ferrero | 426/307 |
| 5,516,540 A | 5/1996 | Cathenaut | 426/249 |
| 5,582,856 A | 12/1996 | White et al. | 426/249 |
| 5,720,175 A | 2/1998 | White et al. | 62/76 |
| 5,891,246 A | 4/1999 | Lund | 118/13 |
| 5,951,766 A | 9/1999 | Miller | 118/667 |

* cited by examiner

METHOD FOR MAKING LACED APPEARING CONFECTIONERIES

CROSS-REFERENCE TO RELATED APPLICATIONS

This application is a continuation-in-part of application Ser. No. 09/145,739 filed Sep. 2, 1998, now U.S. Pat.No. 6,267,073, which is a continuation-in-part of application Ser. No. 08/986,185 filed on Dec. 5, 1997, now U.S. Pat. No. 6,194,014, which is a continuation-in-part of application Ser. No. 08/901,727 filed on Jul. 28, 1997, now abandoned, which is a continuation-in-part of application Ser. No. 08/771,788 filed on Dec. 20, 1996, now abandoned, each of which is expressly incorporated by reference thereto.

BACKGROUND OF THE INVENTION

It has not been possible heretofore to produce chocolate coatings having a laced appearance formed from two layers of chocolate, principally because there is only a very short time period within which the second layer must be applied to the first layer in order to achieve satisfactory adherence. The chocolate layers are usually applied in liquid, semi-liquid, or paste form either by spraying, pouring, dipping, or pressing in a cold environment. Generally, this procedure results in the first layer glazing over to form a frost of condensation shortly after application thereof (less than 30 seconds), which prevents the second liquid layer from adhering properly.

Several references disclose different types of chocolate or other edible coatings having the adherence problems discussed above. For example, U.S. Pat. No. 1,777,896 discloses an edible container shaped like a log made by spreading a plastic edible coating on the outside of a cylinder, adding bonbons to simulate branch stubs, and covering with a second layer of chocolate in a semi-liquid or plastic state.

U.S. Pat. No. 1,865,097 discloses hollow candy bodies made of chocolate having areas of the body formed with a color contrasting with the color of a major portion of the body. The hollow candy body may be prepared by chilling a dark chocolate in a portion of a mold, closing the mold and filling the mold with a light color chocolate, and chilling the mold again to form the light chocolate body overlaid by dark chocolate patches.

U.S. Pat. No. 2,288,970 discloses a confectionery such as ice cream having a coating of chocolate or other edible composition. In particular, the coating is provided with line formations or perforations that are pressed into the coating to control and limit the separation of coating from the confectionery product.

U.S. Pat. No. 2,457,110 discloses a method of coating chocolate edibles by dip-coating the chocolate edible in a coating of sufficiently low viscosity without the addition of cocoa butter. The chocolate is disclosed to be non-flowing at high temperatures due to the lack of cocoa butter in the composition during the dipping.

U.S. Pat. No. 3,971,853 discloses a frozen confection having a plurality of ingredients of individual colors, as well as a gravity feed arrangement for feeding a plurality of nozzles with the individually-colored ingredients so as to facilitate greater distribution of the ingredients.

U.S. Pat. No. 4,189,502 discloses marshmallow and other variegates having the ability to maintain a clear and distinct line of demarcation or delineation with a frozen dessert matrix into which the variegate is incorporated.

U.S. Pat. No. 4,369,200 discloses a method for producing three-dimensional decorations of a fatty confectionery material on a base confectionery, such as with a nozzle attached to a compressible bag for depositing the decorations. The deposition preferably occurs from a rotary sprayer, which deposits the decoration by use of a plurality of recesses in a mold.

U.S. Pat. No. 4,587,128 discloses a method of making an iced piece of cake and providing good adhesion between the icing coating and the cake by adding a bonding layer to a cake, applying the icing, completely enrobing it with a chocolate layer, cooling and solidifying the chocolate layer, and subsequently decorating the top and sides by pressing thereon "squiggles" having a different color.

We have now devised an apparatus and methods for obtaining chocolate coatings having a laced appearance, as well as confectionery or ice cream products having a coating formed thereon from two layers of chocolate, whereby the second layer adheres satisfactorily to the first layer.

SUMMARY OF THE INVENTION

The present invention is directed to an apparatus for applying stripes of liquid coating material on a confectionery which comprises at least one spinning applicator for applying a stripe of coating material onto the confectionery as the confectionery moves past the spinning applicator in a production line, at least one shield positioned adjacent to the spinning applicator to assist in directing the stripe of coating material onto the confectionery, and at least one manifold to provide at least one spinning applicator with the coating material in a liquid form.

The shield may have an arcuate shape and partially surrounds the spinning applicator and one shield may be larger than the other. The apparatus may have at least two shields which are positioned about each spinning applicator to form an aperture which directs the coating material onto the confectionery. The coating is applied to the confectionery at an angle of between about 0° to about 45° relative to a line perpendicularly drawn to the direction of travel of the confectionery in the production line, preferably, the coating is applied to the confectionery at an angle of between about 15° to about 35°.

The shield has at least one edge with a channel having either a U or V shape for collecting excess coating material. The channel has at least two inner edges diverging at an angle of between about 30° to about 60°. The shields can be made of stainless steel, plastic, or aluminum.

The spinning applicator can be a disk, a cup, a pipe, a nozzle, or a combination thereof. The spinning applicator can spin at a rate of between about 50 rpm to about 2500 rpm, and be a disk which is elliptical in shape. The disk may be inclined from the horizontal from between about 5° to about 35°.

In one embodiment of the apparatus two spinning applicators are mounted on opposite sides of the production line facing front and rear faces of the confectionery. Optionally, the confectioneries are moved in multiple directions to apply a laced coating. The apparatus may further comprise a jacketed tank for collecting coating material that is not applied upon the confectionery. The jacketed tank can be heated to a temperature of between about 35° C. to about 45° C.

In one embodiment, the apparatus may have between about 2 to about 24 applicators are utilized in a two row array of between 2 and 12 spaced and offset applicators, with each applicator having shields to prevent liquid coating material from one applicator to contaminate an adjacent applicator, and so that a plurality of confectioneries can be coated simultaneously. The shields are configured, positioned, or dimensioned to prevent coating material from one applicator to spray onto a second applicator.

The present invention is also directed to a method for preparing a confectionery having a coating with stripes comprising supplying liquid coating material to a rotatable applicator, rotating the applicator to generate stripes of liquid coating material, and shielding the applicator as the confectionery moves along a production line to assist in directing the stripes of coating material onto the confectionery. The method may also include applying a layer of at least one chocolate onto the confectionary before or after the application of stripes by dipping or enrobing the confectionary with chocolate or by spraying chocolate onto the confectionary and wherein the chocolate is one of milk chocolate, dark chocolate, white chocolate, or combinations thereof, and optionally where the chocolate is partially substituted with a lesser fat component. The confectionary can be at least one frozen dessert, ice cream, baked product, praline, cake, fondant, water ice, sherbet, wafer cone, ice cream sandwich component, or cookie, and stripes are applied to the confectionary at an angle of between about 0° to about 45° relative to a line perpendicularly drawn to the direction of travel of the confectionery. The stripes are applied at essentially the same size and with a uniform spacing between them and are applied upon the confection when the confection is in a vertical position, some of the stripes are of a color or coating material that is different from the others.

The stripes are applied in the form of a crisscrossed pattern. The crisscrossed pattern comprises at least two different chocolates were at least one chocolate is milk chocolate, dark chocolate, white chocolate, or combinations thereof, optionally where the chocolate is partially substituted with a lesser fat component.

The method may also include collecting and re-using liquid coating material that is dispensed but not applied upon the confectionary.

DETAILED DESCRIPTION OF THE INVENTION

Figure 1:
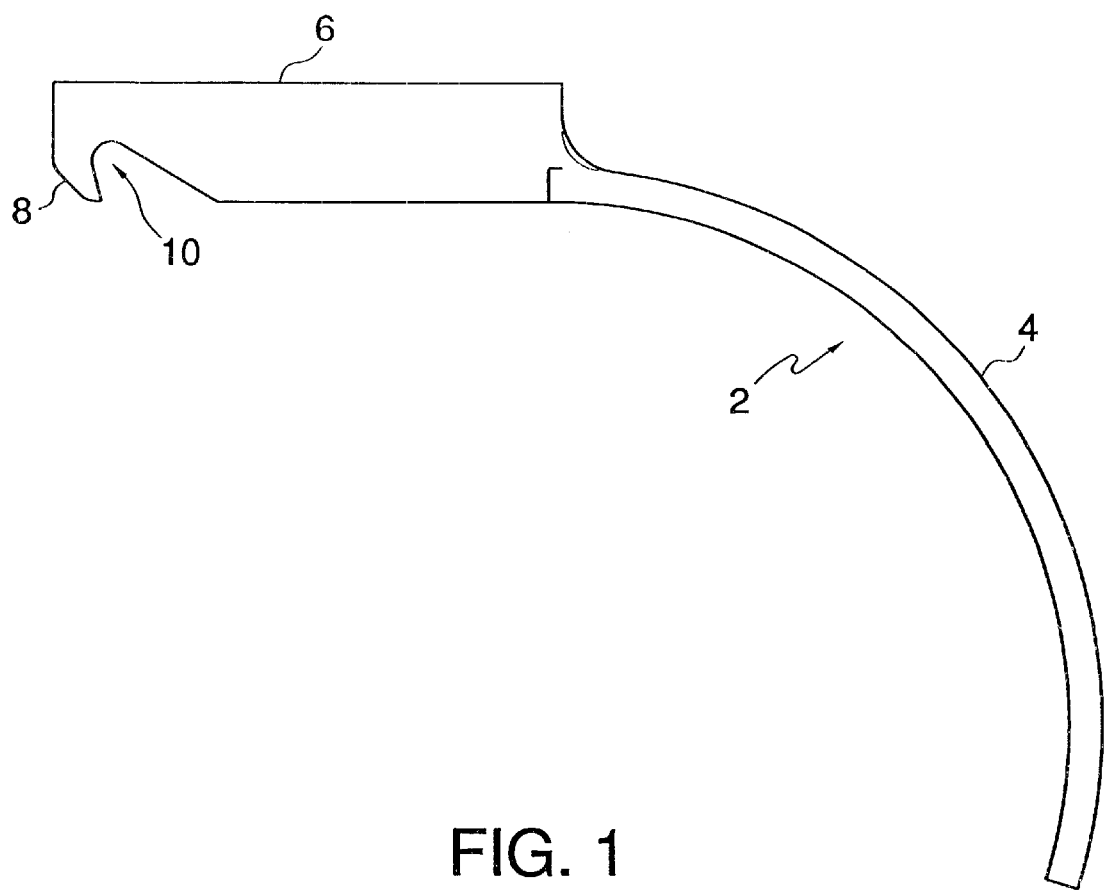
FIG. 1, illustrates a top view simplified layout of one embodiment of a shield.

The present invention advantageously provides a method for making and an apparatus for applying a chocolate coating to a confectionery to produce a confectionery with a laced appearing coating. The laced appearing coating preferably includes more than one type of chocolate, preferably two types of chocolate. Advantageously, the laced appearing coating is formed from two layers of chocolate, a foundation chocolate layer and a laced chocolate layer, thus giving the laced appearing chocolate coating a three dimensional texture.

The present invention provides several advantages including a rapid, efficient, and systematic process for making repeatable coating patterns on individual or multiple confectioneries. Another advantage of the process for making a confectionary with a laced appearing coating is the ease of making uniform crisscross line patterns which are generally symmetrical. Yet another advantage of the present invention, is the ability to create a three dimensional layered laced appearing coating on a confectionary.

The invention is directed to the process and apparatus for making laced appearing coatings on confectioneries. The laced appearing coatings comprise a chocolate foundation layer and a laced appearing layer.

As used herein, the term "foundation layer" means a first layer covering the confectionary.

As used herein, the term "laced" means a repeating symmetrical or geometric pattern of lines spaced at uniform intervals resulting in a pin-striping effect or the like. The design of the apparatus described herein will primarily dictate the type of laced appearance on the confectionary or confectionery product being coated.

As used herein, the term "confectionery" include frozen desserts, ice cream novelties, baked products, and similar confectionery products which may conventionally be coated with chocolate, e.g., praline, cake, fondant, water ice, sherbet, or other filling, also associated food products such as but not limited to wafer cones, ice cream sandwich components, cookies, and other similar comestibles.

As used herein, the term "spinning applicator" means an object capable of rotating while providing a continuous or discontinuous stream of chocolate.

The chocolate foundation layer may be prepared from one or more types of chocolate. Preferably, the foundation layer is formed from different chocolates and chocolates of different colors. The foundation layer can have two chocolate layers having different textures or appearances, e.g., plain chocolate, milk chocolate, or white chocolate. Coatings in which one layer includes either milk or plain chocolate and the other layer includes white chocolate are the most interesting visually because there may be a marked contrast between the darker colored, milk, or plain chocolate, and the white chocolate.

Each foundation layer of chocolate has a thickness between about 0.1 mm to about 2 mm, preferably between about 0.25 mm to about 1.5 mm, and more preferably between about 0.5 mm to about 1 mm.

The chocolate may be ordinary chocolate according to accepted regulations or it may be a fat containing confectionery compound material containing sugar, milk derived components, and fat and solids from vegetable or cocoa sources in differing proportions having a moisture content less than about 10 percent, preferably less than about 5 percent by weight. The fat-containing material may be a chocolate substitute containing direct cocoa butter replacements, stearines, coconut oil, palm oil, butter, or any mixture thereof, nut pastes such as peanut butter and fat; praline; confectioner's coatings used for covering cakes usually comprising chocolate analogues with cocoa butter replaced by a cheaper non-tempering fat; or CARAMAC, a mixture of non-cocoa butter fats, sugar, and milk sold by Nestlé.

The lace appearing layer may have a symmetrical or geometric pattern of crisscross lines spaced at uniform intervals resulting in a pin-striping effect. The pattern includes generally vertical lines crossed by generally horizontal lines, generally angled lines crossed by a second set of generally angled lines, or a set of lines crossed by a second set of lines forming a continuous series of parallelograms. Additionally, the surface can be distorted to provide a less linear laced effect, a roughly continuous or roughly discontinuous pin-stripe effect.

Although each of these are desired arrangements of the chocolate coating according to the invention, it should be understood that any design incorporating these or other similar arrangements may be provided to the chocolate coating.

The process of the present invention includes preparing a chocolate coating having a laced appearance which comprises applying a chocolate foundation layer, if desired modifying the surface, applying a lace appearing coating, and solidifying the chocolate.

The foundation layer is applied to a confectionery by any method know in the art. The foundation layer can be applied by dipping, enrobing, or spraying a chocolate coating onto the confectionary. The chocolate coating may include one or more types of chocolates or mixtures thereof which are applied simultaneously. Optionally, the surface of the foundation layer can-be altered by any means known in the art to alter surface texture.

Subsequently, the confectionary is a passed through a series of spinning applicators that lay strings or droplets of at least one type of chocolate coating onto the confectionary. Preferably, the first chocolate advantageously differs from the second chocolate, e.g., one chocolate is plain or milk and the other is white. Various ratios of the two chocolate layers may be used to achieve different effects.

A typical sequence for applying a laced appearing layer comprises passing at least one confectionary by a series of spinning applicators in an up and down motion. The time between each up and down motion should be between about 0.25 s to about 2 s, preferably between about 0.75 s to about 1.5 s, more preferably for about 1 s.

In one embodiment of the present invention, a confectionary product with a chocolate coating having the appearance of either stripes or spots may be obtained by applying a first chocolate to the confectionary product by enrobing, spraying or dipping to coat the confectionery product with a first layer of chocolate, and then passing the confectionery product between the opposing faces of a pair of spinning applicators from which are projected streams of a second chocolate by centrifugal force onto the coated confectionary product, and then solidifying the coating. The second chocolate may be applied onto the spinning applicators by pumping the chocolate through tubing, e.g., stainless steel tubing.

The laced appearing coating may also be applied to a confectionery in the apparatus in various ways, for example by spraying or pouring the coating from the disks or cups onto the product, by dipping the product into the coating stream, or by passing the product through the apparatus, such as on a conveyor belt. Extruded stick products and cake products are particularly suitable for passing through the apparatus. The relative motions of the apparatus and the product to be coated may be altered by one of ordinary skill in the art to help obtain the desired pattern on the coated product. Different embodiments of the apparatus, such as using cups or pipes in place of the disks, are possible.

In all the above processes for preparing a confectionery or ice cream product with a chocolate coating having a laced appearance, the chocolate used may be tempered or untempered chocolate, is liquid, and the melting temperature may be from between about 28° C. to about 60° C., preferably from between about 35° C. to about 45° C.

The apparatus of the present invention comprises a series of spinning applicators, a manifold, and linkage which are combined into one element. The apparatus is compact and simple which permits the apparatus to be incorporated into existing equipment with great flexibility. The apparatus is easily placed into a moving individual, group, or row of confectioneries, thus, eliminating the need to reconfigure existing product machinery.

Spinning applicators include cups, discs, tubes, or any device known in the art to apply chocolate by centrifugal force. The cups, discs, or tubes apply a continuous chocolate stream by means of a pump. A shield interruption can create a discontinuous stream of chocolate.

The spinning applicators may be made of one or more materials that may safely contact edible products, but are preferably metal to provide durability, and more preferably stainless steel. When the spinning applicator is a disk, the disks may be substantially circular or elliptical and may be of various sizes. It is possible for one disk to have a different shape or size than the other disk of the pair. Preferably the disk is elliptical in shape and the flat surface may advantageously be inclined from the horizontal, e.g., up to about 45° and preferably from between about 5° to about 35°. Advantageously, the inclination is arranged such that the edges of the disks downstream of the direction of conveyance of the confectionery product are closer than the edges of the disks upstream of the direction of conveyance of the confectionery product.

The spinning applicators may be operated by a pump generating a pressure of from, e.g., between about 50 psi to about 150 psi, and preferably from between about 75 psi to about 125 psi.

The spinning applicators are preferably mounted facing the front and rear center of the confectionary. Each confectionary may be passed, for example, vertically or horizontally between the spinning applicators. The spinning of the applicators may be achieved, for instance, by a variable drive motor for each applicator or one or more motors and a timing belt. Any suitable rotating means may be used for spinning the applicators. The design on the confectionary product may be arranged by altering the speed of the spinning applicators. The speed of the applicators is preferably at least about 50 rpm and may be up to about 2500 rpm or more, depending on the space constraints dictated by the machine on which the product is to be made. The speed of the spinning applicator which produces stripes or spots is a function of the distance between the spinning applicator and the product to be coated.

The spinning applicators may be mounted inside a jacketed tank heated above the melting point of the chocolate, preferably from between about 35° C. to about 45° C., by circulating heated water. The tank may be made of any suitable material, such as a metal, and is preferably stainless steel. The heated jacket enables the excess chocolate that has been projected by centrifugal force from the spinning applicators, after coating the confectionery product with the second chocolate, to hit the inside of the tank in a liquid form and then exit the tank for recirculation.

The manifold of the apparatus of the present invention includes any system capable of delivering fluid to the spinning applicators to form a laced appearing coating on a confectionery. A typical manifold is attached to the spinning applicators by tubing, wherein a fluid flows from a chamber or reservoir to the spinning applicator via gravity or by a pump. The manifold may contain two or more spinning applicators wherein each spinning applicator is place on an opposite side of the confectionery.

In an alternative embodiment, the manifold may contain two or more spinning applicators, preferably twelve on each side of a row of confectioneries. Each spinning applicator is separated from the neighboring spinning applicator by a shield. Each spinning applicator is surrounded by two shields, one to either side, each spinning applicator may share a shield with the adjacent spinning applicator. In this embodiment, a confectionary is placed in front of a spinning applicator by a dipping motion, wherein the confectionary is covered with a laced appearing coating from opposite sides. The advantage of this embodiment is that the shield prevents neighboring confectioneries from being covered with chocolate from a spinning applicator not placed in front of the confectionary.

The shields should be sufficiently long to prevent chocolate from one applicator to spray onto a second adjacent applicator. The shields can be of different sizes and shapes, i.e., either bent, straight, or curved, and there may be more than one shield for each spinning applicator and each shield may be of a different size. The shields form an aperture wherefrom the chocolate material is applied to the confectionery at an angle of between about 0° (head-on) to about 45°, preferably between about 15° to about 35°, and more preferably about 25° relative to a line drawn perpendicularly from the surface of the confectionery. Preferably, two shields curve around a spinning applicator forming the aperture, each shield has a different size and the spinning applicator spins towards the longer shield. Each shield has a channel at the edge closest to the confectionery. The channel is substantially U or V shaped having a first inner edge substantially perpendicular to the shield and a second inner edge forming an angle with the first inner edge between about 30° to about 60°, the angle being preferably about 45°.

The shields can be made of any suitable material. Optionally the shields can be made of steel, aluminum, plastic, or combinations thereof. Preferably the shields are made of stainless steel 303 and 304.

The linkage of the apparatus of the present invention is any system capable of holding the assembly of the spinning applicators and the manifold.

Figure 2:
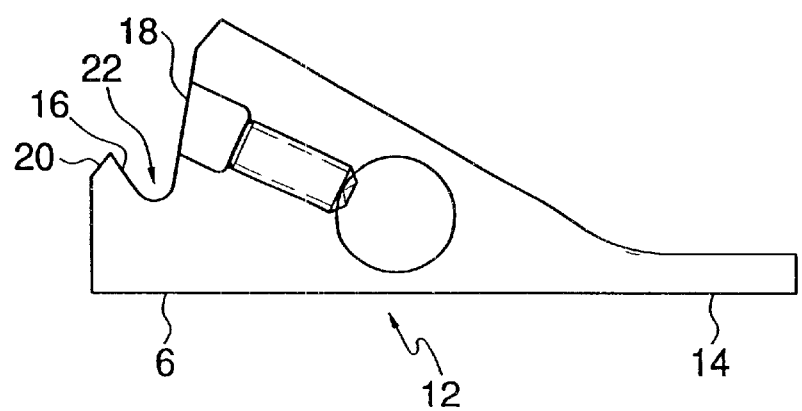
FIG. 2, illustrates a top view of a simplified layout of a shield.

Referring to FIGS. 1 and 2, embodiments of the shields of the present invention are shown wherein in FIG. 1 the shield 2 has a curved shape with an edge having a channel 10. A shield has a back end 4 which is curved to fit around a spinning applicator and a front end 6 positioned closest to a confectionery. The front end 6 has a beveled edge 8 and a channel 10 wherein the channel is in the shape of a V or a U for collecting excess coating material. A second shield 12 may be used in conjunction with the longer shield 2. The second shield has a short back end 14, a front end 6 having a beveled edge 20, and a channel 22 wherein the channel collects excess coating material. The channel 22 is in the shape of a V or a U, preferably wherein a first inner edge 16 is substantially perpendicular to the front end 6 and forming an angle between about 30° to about 60° with the a second inner edge 18.

Figure 3:
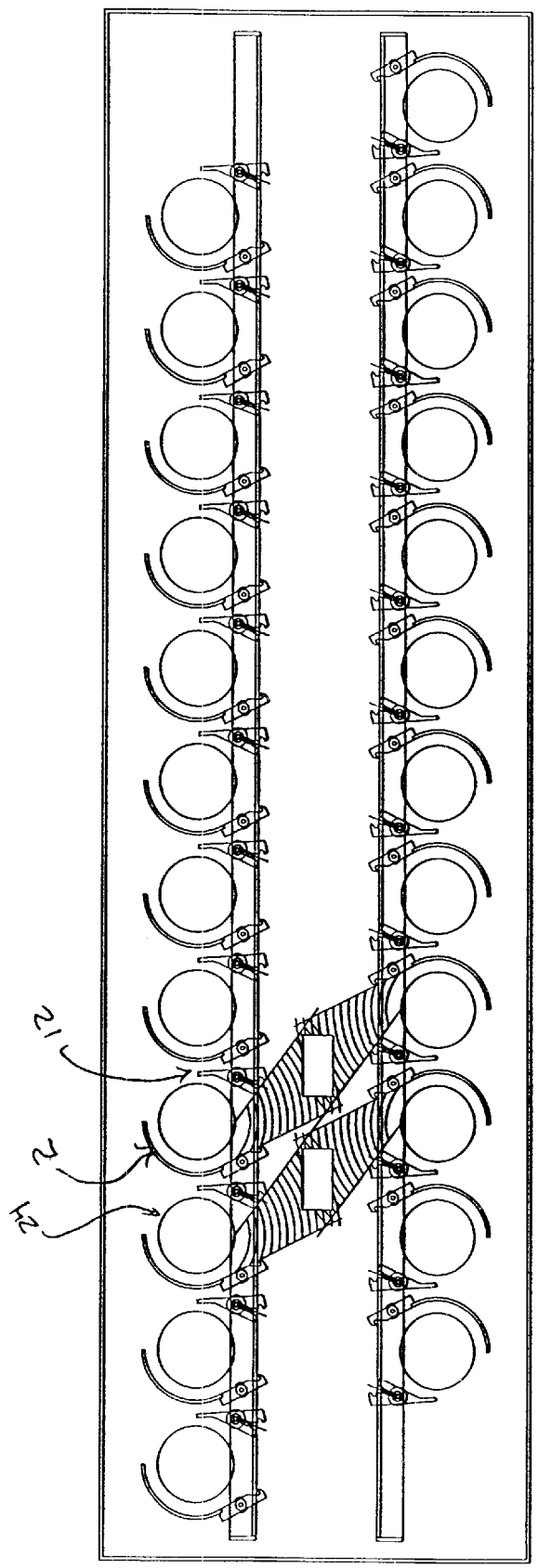
FIG. 3, illustrates a top view array of a two row spinning applicator apparatus with shields.

The spinning applicators and shields can be arranged in an array wherein about 24 applicators 24 are utilized in a two row array of 12 spaced and offset applicators. FIG. 3. Each applicator can have shields 2 and 12 to prevent liquid coating material from one applicator to contaminate an adjacent applicator, and so that a plurality of confectioneries can be coated simultaneously. The shields are configured, positioned, or dimensioned to prevent coating material from one applicator to spray onto a second applicator.

Although preferred embodiments of the invention have been described in the foregoing description, it will be understood that the invention is not limited to the specific embodiments disclosed herein but is capable of numerous modifications by one of ordinary skill in the art. It should be understood that the materials used and the mechanical details may be slightly different or modified from the descriptions herein without departing from the methods and compositions disclosed and taught by the present invention as recited in the claims.

What is claimed is:

1. A method for preparing a confectionery having a coating with stripes comprising supplying liquid coating material to a rotatable applicator; rotating the applicator to generate stripes of liquid coating material; and shielding the applicator as the confectionery moves along a production line to assist in directing the stripes of coating material onto the confectionery.

2. The method according to claim 1, which further comprises applying a layer of at least one chocolate onto the confectionery before the application of stripes by dipping or enrobing the confectionery with chocolate or by spraying chocolate onto the confectionery and wherein the chocolate is one of milk chocolate, dark chocolate, white chocolate, or combinations thereof, and optionally where the chocolate is partially substituted with a lesser fat content.

3. The method according to claim 1, wherein the confectionery is at least one frozen dessert, ice cream, baked product, praline, cake, fondant, water ice, sherbet, wafer cone, ice cream sandwich component, or cookie, and stripes are applied to the confectionery at an angle of between about 0 to about 45 relative to a line perpendicularly drawn to the direction of travel of the confectionery.

4. The method according to claim 1, which further comprises applying a layer of at least one chocolate onto the confectionery after the application of stripes by dipping or enrobing the confectionery with chocolate or by spraying chocolate onto the confectionery and wherein the chocolate is one of milk chocolate, dark chocolate, white chocolate, or combinations thereof and optionally where the chocolate is partially substituted with a lesser fat component.

5. The method according to claim 1, wherein the stripes are applied at essentially the same size and with a uniform spacing between them and are applied upon the confection when the confection is in a vertical position.

6. The method according to claim 1, wherein at least some of the stripes are of a color or coating material that is different from others.

7. The method according to claim 1, which further comprises collecting and re-using liquid coating material that is dispensed but not applied upon the confectionery.

8. The method according to claim 1, wherein the stripes are applied in the form of a criss-crossed pattern.

9. The method according to claim 8, wherein the criss-crossed pattern comprises at least two different chocolates where at least one chocolate is milk chocolate, dark chocolate, white chocolate, or combinations thereof, optionally where the chocolate is partially substituted with a lesser fat component.

10. The method according to claim 1, wherein the stripes of liquid coating material on the confectionery are applied by an apparatus comprising:

at least one spinning applicator for applying a stripe of coating material onto the confectionery as the confectionery moves past the spinning applicator in a production line;

at least one shield positioned adjacent to the spinning applicator to assist in directing the stripe of coating material onto the confectionery; and at least one manifold to provide at least one spinning applicator with the coating material in a liquid form.

11. The method according to claim 10, wherein the shield has an arcuate shape surrounds the spinning applicator.

12. The method according to claim 10, wherein at least two shields are provided and positioned about each spinning applicator to form an aperture which directs the stripes of coating material onto the confectionery.

13. The method according to claim 12, wherein one shield is larger than the other.

14. The method according to claim 12, wherein the shields are configured, positioned, or dimensioned to prevent coating material from one applicator to spray onto a second applicator.

15. The method according to claim 10, wherein the coating is applied to the confectionery at an angle of between about 0° to about 45° relative to a line perpendicularly-drawn to the direction of travel of the confectionery in the production line.

16. The method according to claim 15, wherein the coating is applied to the confectionery at an angle of between about 15° to about 35°.

17. The method according to claim 10, wherein the apparatus includes a shield that has at least one edge with a channel having either a U or V shape for collecting excess coating material.

18. The method according to claim 10, wherein the apparatus includes a channel that has at least two inner edges diverging at an angle of between about 30° to about 60°.

19. The method according to claim 10, wherein the shield is made of stainless steel, plastic, or aluminum.

20. The method according to claim 10, wherein the spinning applicator is a disk, a cup, a pipe, a nozzle, or a combination thereof.

21. The method according to claim 19, wherein the spinning applicator is spinning at a rate of between about 50 rpm to about 2500 rpm.

22. The method according to claim 20 wherein the spinning applicator is a disk which is elliptical in shape.

23. The method according to claim 22, wherein the disk is inclined from the horizontal from between about 5° to about 35°.

24. The method according to claim 10, wherein the apparatus has two spinning applicators mounted on opposite sides of the production line facing front and rear faces of the confectionery.

25. The method according to claim 10, wherein the confectioneries are moved in multiple directions to apply a laced coating.

26. The method according to claim 10, wherein the apparatus includes a jacketed tank for collecting coating material that is not applied upon the confectionery.

27. The method according to claim 26, wherein the jacketed tank is heated to a temperature of between about 35° C. to about 45° C.

28. The method according to claim 10, wherein the apparatus has between about 2 to about 24 applicators which are utilized in a two row array of between 2 and 12 spaced and offset applicators, with each applicator having two shields to prevent liquid coating material from one applicator to contaminate an adjacent applicator, and so that a plurality of confectioneries can be coated simultaneously.

* * * * *

UNITED STATES PATENT AND TRADEMARK OFFICE
CERTIFICATE OF CORRECTION

PATENT NO.    : 6,340,488 B1
DATED         : January 22, 2002
INVENTOR(S)   : French et al.

It is certified that error appears in the above-identified patent and that said Letters Patent is hereby corrected as shown below:

Column 8,
Line 22, change "content" to -- component --;
Line 28, change "0" to -- 0º --, and change "45" to -- 45º --.
Line 44, after "from", insert -- the --; and
Line 49, change "criss-crossed" to -- crisscrossed --.

Signed and Sealed this

Twenty-ninth Day of November, 2005

JON W. DUDAS
*Director of the United States Patent and Trademark Office*